(12) United States Patent
McDowell et al.

(10) Patent No.: US 6,869,534 B2
(45) Date of Patent: Mar. 22, 2005

(54) SLUDGE DIGESTION METHODS AND APPARATUS

(75) Inventors: Curtis S. McDowell, Allentown, PA (US); Chris Hannum, Oley, PA (US); Robert Maurer, Shillington, PA (US)

(73) Assignee: Brentwood Industries, Inc., Reading, PA (US)

( * ) Notice: Subject to any disclaimer, the term of this patent is extended or adjusted under 35 U.S.C. 154(b) by 142 days.

(21) Appl. No.: 10/430,171

(22) Filed: May 5, 2003

(65) Prior Publication Data

US 2004/0011737 A1 Jan. 22, 2004

Related U.S. Application Data

(60) Provisional application No. 60/380,151, filed on May 5, 2002.

(51) Int. Cl.[7] .................................................. C02F 3/00
(52) U.S. Cl. ...................... 210/620; 210/220; 210/739; 210/745; 210/195.1; 210/97
(58) Field of Search ................................. 210/220, 739, 210/745, 195.1, 97, 620

(56) References Cited

U.S. PATENT DOCUMENTS 6,086,765 A * 7/2000 Edwards .................... 210/605

* cited by examiner

Primary Examiner—Chester T. Barry
(74) Attorney, Agent, or Firm—Akin Gump Strauss Hauer & Felf, LLP (57) ABSTRACT

The invention relates to an aerobic wastewater digestion unit useful for degrading organic material dissolved or suspended in a wastewater stream. The wastewater is fed to a vessel, wherein it is circulated by a liquid conveyor between the vessel and a downwardly-directed tube. Expulsion of fluid from the tube into the lower portion of the vessel agitates the liquid in the vessel and disperses into the liquid air that has been entrained in the liquid in the tube. The digester can be operated using varying liquid levels, and is amenable to batch, semi-batch, and continuous operation. The digester is suitable for use in combination with other components of wastewater treatment systems, and can be included as a module in modular wastewater treatment systems.

49 Claims, 4 Drawing Sheets

SLUDGE DIGESTION METHODS AND APPARATUS

CROSS-REFERENCE TO RELATED APPLICATIONS

This application claims benefit of U.S. Provisional Patent Application 60/380,151, "Sludge Digestion Methods and Apparatus", filed May 5, 2002, the subject matter of which is incorporated herein by reference.

BACKGROUND OF THE INVENTION

The invention relates to treatment of wastewater from residential, business, industrial, or other sources.

Wastewaters obtained from various sources can contain bulk solid materials (sticks, rags, sand, and other materials that can be screened or filtered therefrom), smaller suspended solid materials that cannot be easily removed by screening or filtration; organic material, such as fine semi-biodegradable organic solids, soluble organic chemicals, pathogenic microorganisms (e.g., bacteria, viruses, spores, cysts, and protists), undesirable nutrients (e.g., nitrogen- or phosphorous-containing compounds that can encourage nuisance growth of algae or weeds at the wastewater discharge site); and inert solid particles (e.g., grit and sand). Discharge of these materials (many of which exert biological oxygen demand {BOD} when discharged) into the environment with the wastewater can have undesirable health and environmental consequences. As a result, wastewater discharges are closely regulated by state and national governments.

Many methods exist for removing undesirable components from wastewater prior to its discharge. Typically, a wastewater treatment method might include one or more treatment steps in which settleable and floatable solids materials are removed, one or more (aerobic and/or anaerobic) microbial degradation steps in which most suspended solids and soluble BOD are removed, and one or more further treatment steps in which wastewater is clarified, disinfected, or further purified.

Solids and suspensions of solids, including inorganic material and organic material, that are removed from wastewater during processing are referred to as sludge. Sludge can be generated at multiple points during wastewater processing, such as at primary and secondary settling steps, and during microbial degradation of wastewater components. Sludges often have strong odor and contain toxic or infectious agents. As a result, wastewater sludge is often treated to degrade odiferous, infectious, or toxic components. Sludge that remains after wastewater treatment must be discarded, for example in a landfill or, less commonly, an incinerator or applied to land (e.g., as a soil fertilizer).

Sludge disposal can represent one of the greatest expenses and most cumbersome steps associated with wastewater treatment. Therefore, reduction of sludge volume can significantly reduce processing costs and improve operating efficiency.

Digesters are processing units that can be used to degrade sludge generated during wastewater processing. The digestion process occurs in the presence of microorganisms and produces carbon dioxide, water, inorganic salts, and (sometimes) methane gas as the microorganisms break down various organic components of the sludge, using them as a source of nutrients and energy for growth. The digestion process results in an increase in the amount of biological material (e.g., microorganisms) but an overall reduction of organic sludge mass. Sludge digesters have been used for many years in wastewater treatment plants in order to reduce the mass of sludge produced, the volume of de-watered sludge that must be disposed, and to reduce the toxicity, infectivity, or both, of sludges produced by wastewater treatment processes. Although there are many configurations, two general types of sludge digesters are used: anaerobic and aerobic digesters.

Anaerobic sludge digesters are large, enclosed vessels that permit conversion of organic materials in sludge to carbon dioxide, water, inorganic salts, and methane. Anaerobic sludge digestion is typically used for concentrated primary sludge having a relatively high BOD strength (e.g., >200,000 milligrams per liter BOD equivalent). This process often involves heating of at least a portion of the digestion apparatus, and can be influenced significantly by fluctuations in operating conditions, input rates, alkalinity, pH, temperature, and populations of organisms in the digester, some of which organisms can interact in counter-productive ways.

Aerobic sludge digesters also convert sludge to carbon dioxide, water, and inorganic salts, but without significant production of methane. Compared with anaerobic digestion units, aerobic digesters are less easily influenced by fluctuations in sludge input, operating conditions, or the specific population of organisms in the digester. However, because aerobic digesters require mixing and aeration of the reactor contents, their construction and their operating and maintenance costs can be higher than anaerobic digesters. Also, the physical layout of aerobic sludge digestion units often limits their use to processes in which a certain volume of wastewater and or sludge can be maintained in the digester.

Only a portion of sludge produced in a wastewater treatment process can be digested, whether by an anaerobic or an aerobic digester. The remaining sludge must be discarded. A significant drawback of aerobic sludge digesters is that the sludge that remains following the digestion process is generally much less concentrated (e.g., less than 2% solids, by dry weight) than sludge produced in an anaerobic digester, which can have concentrations of 6–7% solids, by dry weight. The lower solids content of sludge resulting from aerobic digestion processes increases the disposal costs, increases processing costs necessary to decrease sludge volume, or both. Aerobic digesters are typically limited to digestion of biological sludge from the final clarifiers of a biological treatment system because the high-strength BOD of primary sludge would overwhelm their aeration capacity, leading to problems with foul odors.

A need remains for aerobic sludge digestion apparatus and methods that maintain the speed and ease-of-processing characteristics of existing aerobic degradation processes, but which are able to yield a more concentrated sludge than those existing processes. The invention satisfies this need, at least in part, by providing an improved aeration method capable of handling primary and secondary sludges combined, decreased odor potential, and an easily automated sludge thickening method.

BRIEF SUMMARY OF THE INVENTION

The invention relates to an aerobic digester for organic material comprising a vessel, a tube, and a liquid conveyer. The vessel is suitable for containing a liquid comprising the organic material. The vessel has an interior comprising i) an upper portion, ii) a lower portion and iii) a lower interior surface. The tube has a distal end disposed in the lower portion of the interior of the vessel, an opening in a wall of the tube for permitting liquid- and air-flow between an exterior and an interior of the tube, and at least one discharge port disposed in the distal end. The liquid conveyor is connected in fluid communication with the interior of the tube for inducing flow of the liquid along the tube in the direction of the distal end. The liquid conveyor induces entrainment of air drawn into the tube through the opening into the liquid drawn into the tube through the opening to form a liquid-air mixture and expulsion of the liquid-air mixture from the tube through the at least one discharge port into the lower portion of the vessel. The liquid-air mixture expelled from the tube into the lower portion of the vessel thereby causes liquid contained in the vessel to be mixed and aerated. Organic material in the vessel is digested.

The liquid conveyor can be at least partially disposed within the tube. In one embodiment, the liquid conveyor comprises a motor having a shaft rotatably connected thereto. The shaft has an impeller attached thereto, and the impeller is disposed within the tube at a level below the lowermost level of the opening. The tube may comprise two or more openings spaced along the length of the tube, and the liquid conveyor may comprise two or more impellers, each of the impellers being disposed below a different opening. If the tube is provided with multiple openings, air will typically enter through the upper opening or a portion thereof while liquid will enter the tube through the lower openings in the tube. Air may be supplied to the upper portion of the vessel by a fan.

In a specific embodiment of the digester described herein, the tube comprises an upper opening, an intermediate opening distally disposed along the length of the tube below the upper opening, and a lower opening distally disposed along the length of the tube below the intermediate opening. The liquid conveyor comprises an upper impeller disposed below the intermediate opening, but above the lower opening, and a lower impeller disposed below the lower opening.

The tube can have one or more internal baffles, extending along at least a portion of a length of the tube, for the purpose of reducing liquid flow in directions not parallel with a longitudinal axis of the tube. The baffle(s) can, for example, extend along the tube above the uppermost impeller, between two impellers, below the lowermost impeller, or some combination thereof. The tube is preferably oriented substantially vertically, with its distal end downward. In some embodiments, the tube has a substantially constant diameter and a substantially circular cross-section along its entire length. The tube can be fixed to or supported by the lower interior surface of the vessel, for example by way of extensions from the distal end of the tube to the lower interior surface.

Each opening should extend through about 10% of the circumference of the tube, but preferably no more than about 20% of its circumference. Each opening is preferably dimensioned such that the combined area of the openings is preferably about 20% of the cross-sectional area of the tube at the level of the opening.

The digester can further comprise a liquid inlet (e.g., one in fluid communication with a solids discharge outlet of a wastewater primary clarifying apparatus) for providing undigested liquid sludges to the interior of the vessel. The liquid inlet preferably discharges into the lower portion of the interior of the vessel.

The digester can also comprise a liquid outlet for discharging liquid continuously from the interior of the vessel. This liquid outlet can, for example, be in fluid communication with an decant weir having an opening disposed at or near the upper surface of the liquid in the vessel, for withdrawing liquid from at or near the upper surface of the liquid and delivering the withdrawn liquid to the liquid outlet. The decant weir can be fixed in the interior of the vessel, whereby the decant weir maintains a maximum liquid depth in the vessel. Alternatively, the decant weir can be vertically movably disposed in the interior of the vessel with respect to the lower surface of the vessel so that various liquid depths may be maintained within the vessel. One or more baffles can be interposed between the distal end of the tube and the liquid outlet, in order to inhibit withdrawal from the vessel of solids suspended in the liquid by creating a quiescent zone for solids settlement and return of the solids to the aerated mixed zone. A suspended solids sensor (e.g., a turbidity or viscosity sensor) can be in sensory communication with liquid in the liquid outlet, the liquid within the vessel or the liquid within the decanter, and an alarm can be connected in signaling communication with the sensor, to indicate when the level of suspended solids in such liquid exceeds a selected value. Furthermore, the vessel can have a solids disposal outlet in fluid communication with a flow regulator (e.g., a valve or pump) that is in fluid communication with the lower portion of the interior of the vessel and in signaling communication with the sensor. The flow regulator permits withdrawal of liquid and residual sludge from the vessel by way of the solids disposal outlet when the level of suspended solids in liquid in the liquid outlet exceeds a selected value.

The digester can comprise a solids disposal outlet in fluid communication with the lower portion of the interior of the vessel. The outlet can also be in fluid communication with a sludge holding tank for storing withdrawn liquid, or a solids filter for separating liquid withdrawn from the vessel into filtered solids and solids filtrate fractions. In this latter embodiment, the filter can comprise a return line for returning the solids filtrate to a biological reactor.

The invention also relates to a wastewater treatment system comprising a primary clarifier for removing bulk solids from a wastewater stream, the primary clarifier being upstream from a biological reactor for degrading an organic material in the stream, the reactor being upstream from a secondary clarifier for removing solids from the post-reactor wastestream, and the digester described herein in fluid communication with a solids discharge outlet of one or both of the primary clarifier and the secondary clarifier. The system can have a single pump that selectably connects the primary clarifier, the biological reactor, the secondary clarifier and the digester by way of multiple fluid circuits.

In another aspect, the invention relates to a method of aerobically digesting organic material in wastewater, the method comprising the steps of:

a) providing the wastewater comprising the organic material to a digester that comprises:

a vessel for containing a liquid, the vessel having an interior comprising an upper portion and a lower portion and a lower interior surface;

a tube having a distal end disposed in the lower portion of the interior of the vessel, an opening in the wall of the tube for permitting liquid and air flow between the exterior and interior of the tube, and at least one discharge port disposed in the distal end; and a liquid conveyor disposed within the tube for inducing flow of the liquid through the tube in the direction of the distal end, the conveyor comprising an impeller disposed below the opening; and b) circulating the liquid in the digester by way of the tube, whereby the conveyor induces entrainment of air into the liquid drawn into the tube by way of the opening to form a liquid-air mixture and expulsion of the liquid-air mixture from the tube through the at least one discharge port, thereby inducing mixing and aeration of the liquid in the vessel and digesting organic material in the wastewater.

The method may further comprise the step of operating the liquid conveyor for a predetermined period. The method may still further comprise the step of discontinuing operation of the liquid conveyor to allow gravity sedimentation of solids in the wastewater for a predetermined period. The method may still yet further comprise the step of testing the clarity of the liquid in the vessel at a predetermined position within the vessel. Based on the measured clarity, the method may further include the step of withdrawing liquid from a lower portion of the vessel if the clarity is below a predetermined level or the step of withdrawing liquid from an upper portion of the vessel if the clarity is above a predetermined level.

The method may further comprise the step of withdrawing liquid from an upper portion of the interior of the vessel, whereby the withdrawn liquid comprises a lower level of organic material than the wastewater. The method may further comprise the step of re-circulating the liquid in the digester for a selected period, thereafter not re-circulating the liquid in the vessel for a selected period thus creating a clarified liquid at the top of the vessel, and thereafter displacing the clear top liquid from the vessel by pumping fresh undigested wastes from a sludge source into the lower portion of the vessel. The method may further comprise a step of monitoring a level of the liquid within the vessel and maintaining the level substantially constant by controlling the supply of wastewater and withdrawal of liquid from either or both of the upper portion through a decanter or the lower portions of the vessel as thickened digested sludge. The method may further comprise a step of monitoring the level of organic material contained in liquid withdrawn from the upper portion of the vessel, and controlling supply of wastewater, operation of the liquid conveyor and withdrawal of liquid from the vessel to maintain a desired level of organic material in the vessel.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

DETAILED DESCRIPTION OF THE INVENTION

With reference to the figures, the invention relates to an improved aerobic wastewater digester and methods of operating it. Prior aerobic wastewater digesters have the drawbacks that they often yield residual sludge that is relatively non-concentrated and much less thoroughly digested than is theoretically possible. As a result, prior aerobic digesters yielded relatively large amounts of relatively poorly concentrated sludge, resulting in larger sludge disposal costs than can be obtained using the digesters disclosed herein. As described herein, the improved sludge digester can more thoroughly degrade wastewater sludge and concentrate it to a greater degree than previous aerobic sludge digesters, thereby reducing the costs associated with disposal of the sludge and potentially rendering it more amenable for post-digestion sludge processing. In addition, the aerobic sludge digester disclosed herein can be operated under a wider range of conditions than other digesters, including under low or intermittent wastewater-flow conditions. As a result, the digesters described herein can potentially be used in situations in which prior aerobic sludge digesters might be impractical or non-economical.

Figure 1:
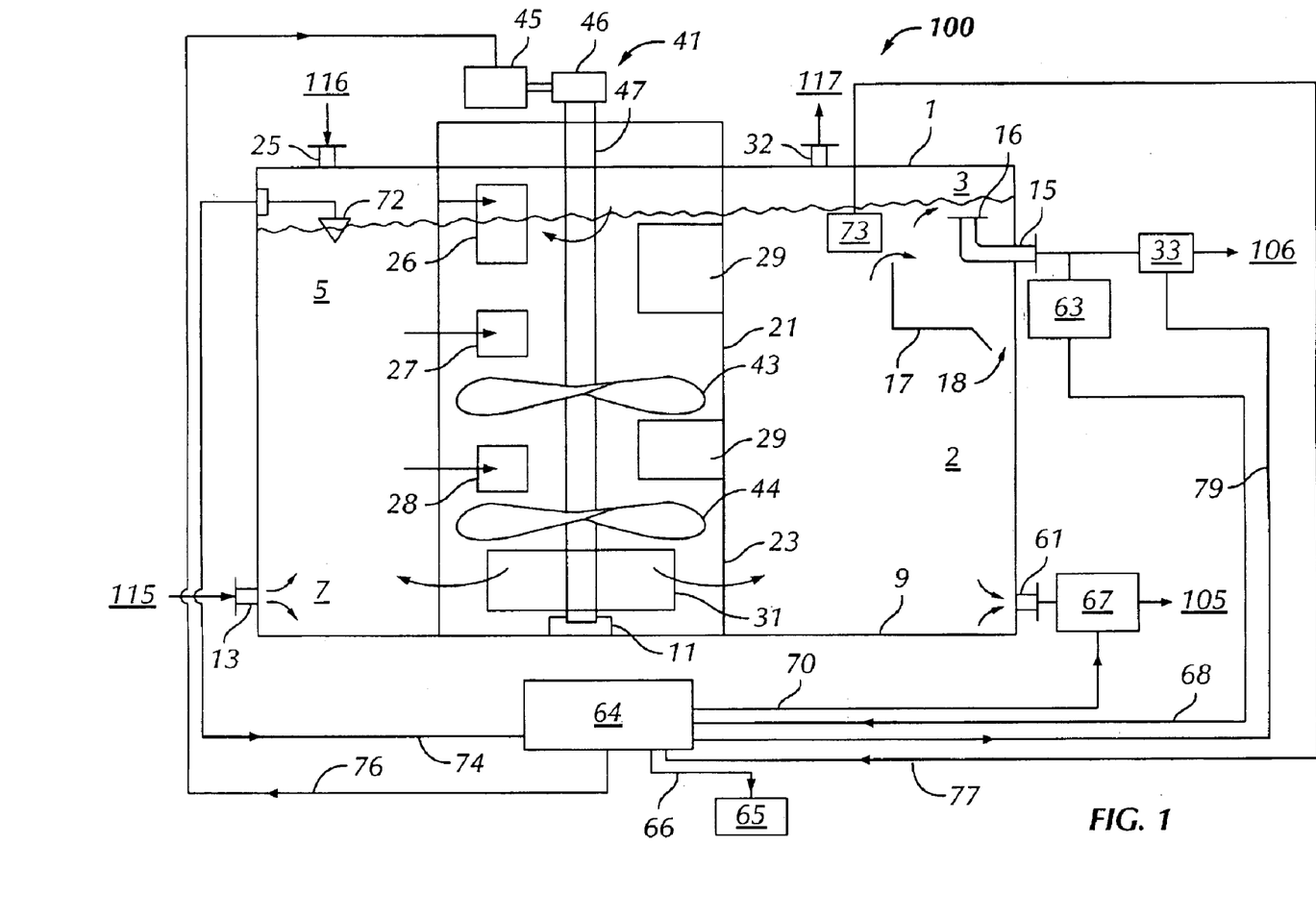
FIG. 1 is a schematic representation of one embodiment of a sludge digester in accordance with the present invention.

With particular reference to FIG. 1, the sludge digester 100 comprises a vessel 1, a tube 21 and a liquid conveyor 41. The vessel 1 has an interior which may be divided into an upper portion 5 and a lower portion 7. The vessel 1 is designed to contain wastewater liquid 2 having microbially-degradable, dissolved or suspended organic material therein. Air is provided to a space 3 within the vessel 1 and above the liquid 2. The vessel 1 further includes a lower interior surface 9. The vessel 1 includes a liquid inlet 13 preferably disposed in the lower portion 7, a liquid outlet 15 preferably disposed in the upper portion 5 and a solids disposal outlet 61 preferably disposed in the lower portion 7. Feed wastewater 115 is provided to the vessel 1 by the liquid inlet 13. Make-up air 116 is provided to the vessel 1 by an air inlet 25 disposed in the head space 3 while carbon dioxide and other expended gases 117 are vented from the vessel 1 through a vent 32 disposed in the head space 3. The liquid outlet 15 may be connected to a flow control device, for example a decant weir 16 and a motorized valve 33. The decant weir 16 can be fixed to operate at a single fixed level, or alternatively can be manually or automatically adjustable in height. A baffle 17 may be provided to minimize the passage of digested solids within the liquid 2 over the decant weir 16 and into the liquid outlet 15. Solids so collected by the baffle 17 would exit the baffle 17 through an opening 18. Solids passing though the opening 18 are re-entrained in the liquid 2.

A tube 21 is disposed within the vessel 1 such that a distal end 23 of the tube 21 is in the lower portion 7 of the vessel 1. The tube 21 is provided with at least a first opening 26 preferably located such that at least a portion of the opening 26 is disposed within the space 3 during operation of the digester 100. Additional openings, for example a second opening 27 and a third opening 28 may be provided. Flow straightening baffles 29 may be provided along an interior of the tube 21. The tube 21 is further provided with at least one discharge port 31 disposed near the distal end 23.

The liquid conveyor 41 comprises an elongated shaft 47. At least a first impeller 43 is rigidly attached to the shaft 47. Additional impellers, such as second impeller 44 illustrated, may be provided. Preferably, each impeller 43, 44 is located proximate an opening, for example second and third openings 27 and 28, as illustrated in FIG. 1. The shaft 47 is driven to rotate by a motor 45 and a gearbox 46. A detailed description of the motor, gearbox and drive shaft arrangement is not required, being conventional and from this disclosure being obvious to one of ordinary skill in the art. A distal end of the shaft 47 is supported by a support 11. The support 11 is a conventional bearing or bushing shaft end support.

In the embodiment illustrated in FIG. 1, the sludge digester 100 is further provided with a controller 64, described in greater detail later herein. The controller 64 receives input signals 68, 77 and 74 from suspended solids sensors 63 and 73 and liquid level sensors 72, respectively. The controller 64 provides control signals 70, 79, 76 and 66 to flow regulating elements 67 and 33, liquid conveyor drive motor 45 and an alarm 65, respectively.

In operation of the sludge digester 100, the feed wastewater 115 is supplied to the vessel 1 via the liquid inlet 13. A flow regulation device, for example a manual or automatic valve (not shown) may be included in the conduit (not shown) supplying the feed wastewater 115, the flow regulation device (not shown) operating to select the source of feed water 115, the duration of feed wastewater 115 flow and/or the timing of feed wastewater flow 115 relative to the operation of the liquid conveyor 41. The liquid conveyor 41 may be operated to rotate the first and second impellers 43, 44 to draw air and liquid 2 into the tube 21 through the first opening 26 and liquid into the tube 21 through the second and third openings 27, 28 and to expel aerated liquid out of the tube through the discharge port 31. As the liquid 2 moves into and out of the tube 21, the liquid conveyor 41 preferably both agitates and aerates the liquid 2 in the vessel 1. Rotation of the shaft 47 induces production of liquid vortices within the tube 21 at the liquid/air interface therein and the vortices cause entrainment of air from the head space 3 into the liquid 2 in the tube 21 forming a liquid-air mixture, with the result that when the liquid-air mixture is expelled from the distal end 23 of the tube 21 into the lower portion 7 of the vessel 1 through the discharge port 31, the liquid in the vessel 1 is agitated and aerated.

Agitation of the liquid 2 in the vessel 1 improves contact between microorganisms and organic material in the liquid, thereby improving the ability of the microorganisms to degrade the organic material. The amount of oxygen that microorganisms in an aerobic digester are able to extract from the digester medium is often a limiting factor in the rate and completeness of the degradation of organic material in the digester. Aeration of liquid in the vessel 1 improves oxygen supply to the microorganisms, and thereby improves the rate and degree of completeness of organic material degradation. Improved agitation and aeration provided by the digester described herein can thereby decrease the time required for degradation of a selected amount of sludge from a wastewater stream, increase the amount of sludge that is digested, and reduce the amount of residual sludge produced by the digester, relative to prior aerobic digester units.

In one embodiment of the digester 100, the decant weir 16 floats on the surface of the liquid 2. In this embodiment, the decant weir 16 is operational over a range of liquid levels. The tube 21 may be provided with a plurality of openings arranged such that there is an opening at any given level within a range of liquid levels, allowing the digester 100 to be operational over a range of liquid levels. In a second embodiment of the digester 100, the level of the decant weir 16 is fixed, and the digester 100 is intended to operate at a generally fixed liquid level and also while it is in the process of filling, wherein the liquid conveyor 41 operates continuously until the level sensor 72 detects that the filling process is complete and signals 74 the controller 64 to begin a second operating cycle. Then the liquid conveyor 41 is operated for a preset time for mixing and aeration of liquid 2 and then is switched off for a preset time before the feed wastewater 115 is introduced through wastewater inlet 61 to displace clarified liquid 2 from the vessel 1 through the decant weir 16, outlet 15 and valve 33. The valve 33 is opened only if solids sensor 73 indicates that upper level 5 of liquid 2 is relatively free of solids. If the liquid 2 at the upper level 5 of the vessel 1 is not clarified as indicated by the sensor 73, the valve 33 will not open, nor will any feed wastewater 115 be allowed to flow through the inlet 13 into the vessel 1. A high solids signal 77 from the sensor 73 will likewise send a signal 66 to the alarm device 65 to warn the operator to remove solids from the vessel 1 through the outlet 61 or similarly will signal the control device 67 to remove liquid 105 containing a high level of solids to a storage facility (not shown) or solids processing unit (not shown). The control device 64 may also be programmed to send a signal 66 to the alarm device 65 to warn the operator to take action in removing digested liquids from vessel 1 manually and to restart the liquid conveyor 41 to continue mixing and aeration of the liquid 2 until the operator takes appropriate action.

Figure 2:
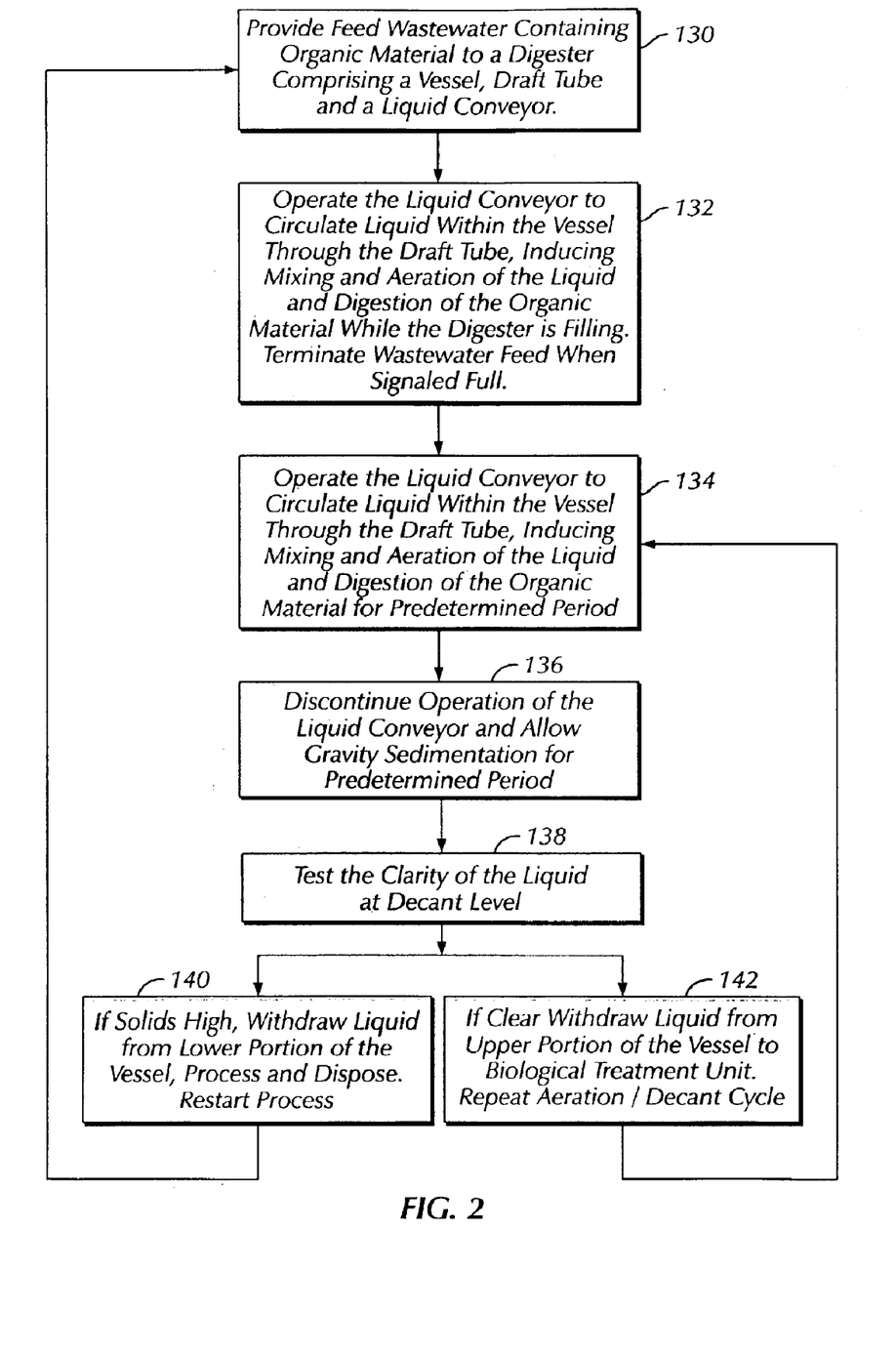
FIG. 2 is a diagram illustrating steps of a method of digesting wastewater sludge in accordance with the present invention.

With particular reference now to FIG. 2, a method of using the sludge digester 100 is illustrated. The method comprises a first step 130 of providing feed wastewater containing organic material to the sludge digester 100 described herein on an intermittent basis as the wastewater or sludge is available for disposal from primary and or secondary clarifiers in the wastewater treatment system. In a second step 132, operation of the liquid conveyor is initiated as the digester vessel is filling, thereby beginning the sludge digestion process for the first time or as a new batch after disposal of a previous mass of digested sludge. Flow of the wastewater 115 is terminated when the sensor 72 indicates the vessel 1 is full. In a third step 134, a timed cycle is initiated in which the liquid conveyor 41 is operated continuously for a prescribed period of time, e.g. 10 hours for each of two cycles per day (i.e., the digestion cycles). In a fourth step 136, the liquid conveyor is stopped for a period, e.g. 2 hours, at the end of each digestion cycle, to allow gravity sedimentation of the solids in the digester (i.e., the sedimentation cycles). In a fifth step 138, the solids content of the liquid in the gravity clarified upper layer 5 or in the decanter is checked by the sensor 73 and a signal 77 is sent to the controller 64, being in communication with the sensor 73. The controller 64 elects either step 140 or step 142 as the next process. In a sixth step 140 an alarm signal 66 is generated to alert the operator to remove concentrated digested solids, or a signal 70 is generated to initiate automatic removal of concentrated digested solids by way of the outlet 61. Additional signals (not illustrated) are sent to the flow regulating device (not shown) in the wastewater 115 feed line, and further flow of the wastewater 115 to the digester is precluded. Operation of the liquid conveyor 41 may also be re-started by the controller 64 via a motor control signal 76 to continue digestion until the operator takes action by removing the liquid 105 via the outlet 61 by manual or automatic operation of the flow regulating device 67. If the sensor 73 indicates clear liquid or low solids, a seventh step 142 is initiated wherein fresh wastewater 115 is supplied to the inlet 13 and flow regulating device 33 is operated so that the low turbulence flow of the wastewater 115 into the full vessel 1 displaces the clear liquid 2 through the decanter 16 into the outlet 15 and out of the digester 100. When the flow of the wastewater 115 is terminated or if the sensor 73 signals high solids content, terminating flow of wastewater 115, the liquid conveyer 41 is re-started (step 134) and the digestion sedimentation cycle is repeated. The sixth and seventh steps 140, 142 are preferably performed in the alternative, and the third through seventh steps 134 through 142 are preferably performed on an on-going basis.

Figure 3:
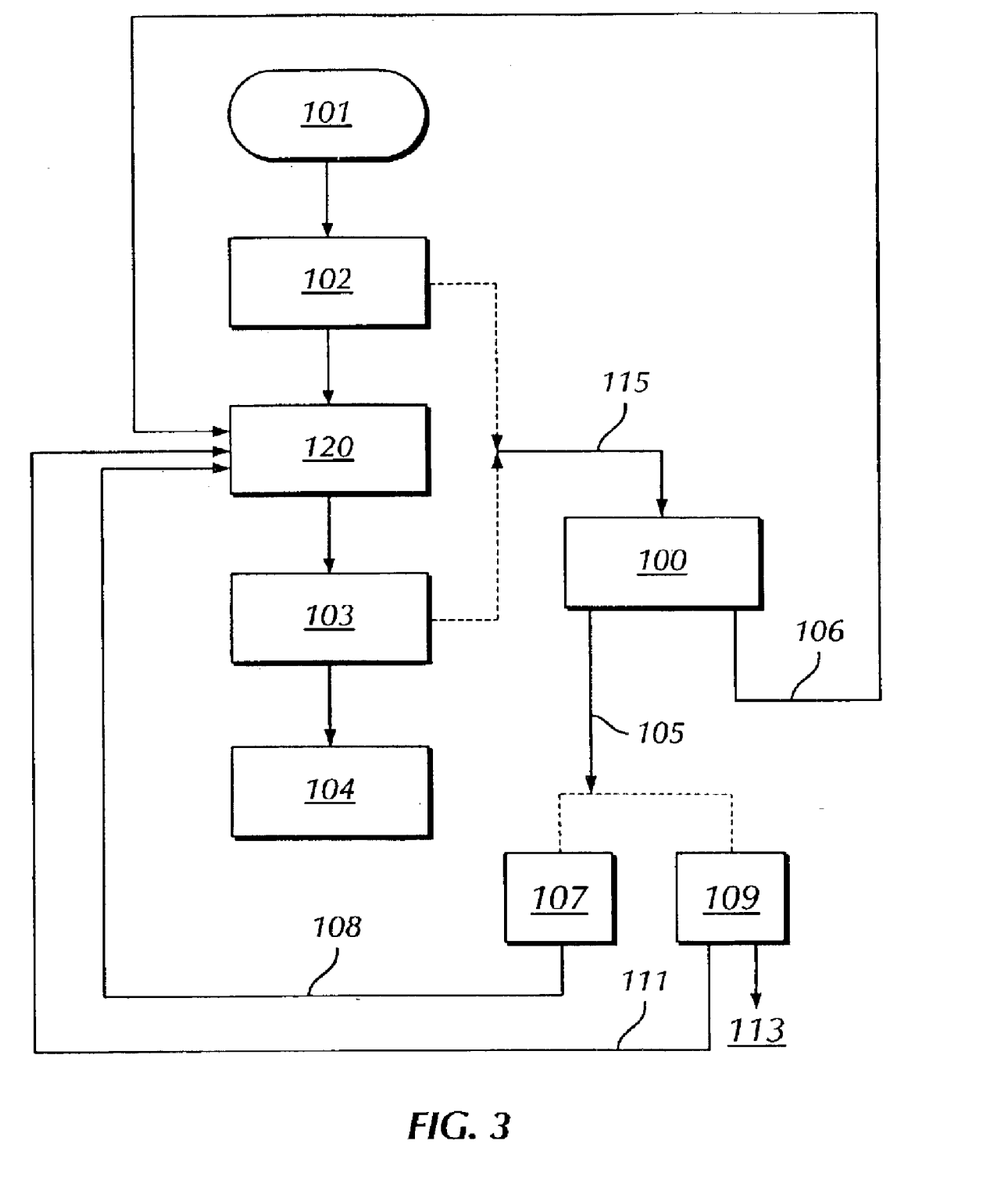
FIG. 3 is a diagram illustrating a preferred arrangement of elements of a wastewater treatment system including a preferred embodiment of the sludge digester in accordance with the present invention.

With reference now to FIG. 3, the sludge digester 100 may be incorporated into a multi-component wastewater treatment system, such as the system schematically illustrated in FIG. 3. Feed wastewater is provided from a source 101 to a primary clarifier 102, thence to a biological reactor 120, thence to a secondary clarifier 103, and thence to a sterilizer 104. Solids, or a liquid-solids slurry can be withdrawn from either or both of the primary clarifier 102 and the secondary clarifier 103 and provided to the digester 100 described herein for digestion and concentration of sludge. Residual sludge 105 can be stored, for example, in a sludge holding tank 107 either until the tank 107 is full or until a selected sludge disposal time. In this embodiment, any clarified liquid in the tank 107 can be returned to the biological reactor 120 at the time of disposal via a holding tank return line 108. Residual sludge 105 from the digester 100 may also be fed to a solids filter 109. The filter 109 separates filtered solids 113 from liquid in which the solids were suspended. The filtrate can be fed to a biological reactor 120 by way of a solids filtrate return line 111, and the filtered solids 113 can be stored or dried further prior to disposal.

Figure 4A:
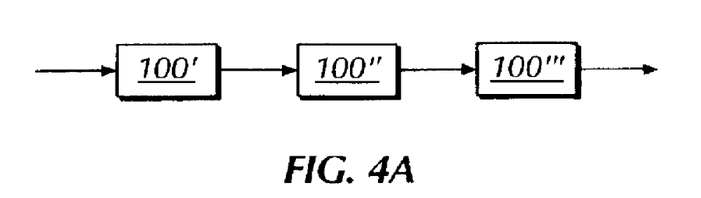
FIGS. 4A, 4B and 4C are diagrams that illustrate suitable arrangements of multiple sludge digesters in accordance with the present invention.
Figure 4B:
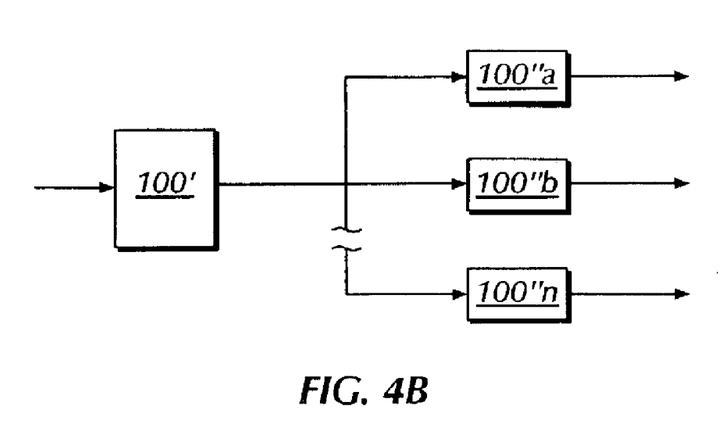
Figure 4C:
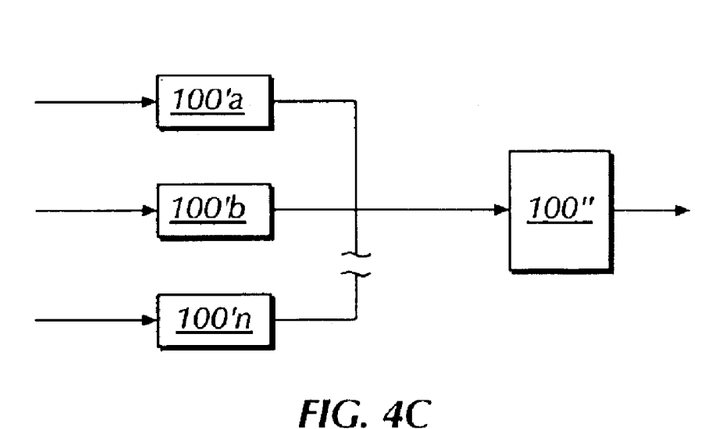

With reference now to FIGS. 4A, 4B and 4C, it is contemplated that multiple digesters 100 can be used in series or in parallel in a variety of configurations. FIG. 4A illustrates a first stage digester 100' in series with a second stage digester 100" in series with a third stage digester 100'". FIG. 4B illustrates a single first stage digester 100' in series with a plurality of second stage digesters 100"$a$, 100"$b$ and 100"$n$, where 100"$n$ represents an arbitrary $n^{th}$ unit, all of the second stage digesters being connected in parallel with one another. FIG. 4C illustrates a plurality of first stage digesters 100'$a$, 100'$b$, 100'$n$ connected in parallel with one another and further connected in series with a single second stage digester 100". From this disclosure the artisan would recognize that the digester 100 may be combined in an endless variety of multi-stage series and/or parallel configurations.

Further details regarding the sludge digester 100 are described herein below. It should also be noted that the methods described herein can be applied by making relatively simple modifications to existing aerobic or anaerobic digester units. By way of example, a tube 21 and associated liquid conveyor 41 can be added to an existing digester (e.g., in place of present stirring or aeration apparatus) in order to improve its performance.

Except as described herein, the precise arrangement and construction of the various components of the improved digester are not critical. In the following sections, additional relevant characteristics of the components of improved digesters are described.

The Vessel

The vessel of the digester described herein can be substantially the same as the vessel of any known aerobic or anaerobic digester. The vessel functions to contain the wastewater containing the organic material to be digested. The vessel can be designed, using a variety of known methods, to maximize circulation of liquid driven by liquid flow through the tube. For example, the lower interior surface of the vessel can be rounded (e.g., hemispherically or parabolically) in order to discourage accumulation of non-fully-digested sludge in portions of the vessel. Part of the vessel (i.e., the lower portion or the lower interior surface) can be adapted to ease collection or disposal of solids from the liquid in the vessel, although this region can simply be a lower (i.e., not specially adapted) region of the vessel. The digester vessel can include a mechanical rake to physically urge settled solids toward one or more parts of the vessel. The rake can have one or more flexible blades attached thereto, and the blades can physically scrape a portion of the interior surface of the vessel in order to dislodge therefrom any solids that may have adhered to that surface. Containers suitable for use as digester vessels are available from numerous commercial sources, and substantially any commercially available digester vessel can be modified to perform as described herein.

The material(s) from which the vessel of the digester is constructed is not critical. The ordinary engineer will understand that the material should be selected such that it exhibits sufficient strength to economically contain the wastewater to be treated in the system and that the corrosion resistance of the material should be selected to yield a practical lifetime for the digester, in view of the wastewater to be fed to the digester. Typical materials used to make digester vessels include plastics, concrete, stainless steel, and less corrosion-resistant materials (e.g., steel or aluminum) that are coated, at least on their interior surfaces, with a corrosion-resistant material (e.g., plastic, rubber, bitumastics, or glass).

The shape of the vessel is likewise not critical. In an embodiment illustrated in vertical cross-section in FIG. 1, the vessel 1 is cylindrical, but other shapes can be used. Although fabrication of cylindrical vessels can be simpler than fabrication of vessels having other shapes, vessels having rounded (i.e., corner-less) shapes can help to prevent sludge accumulation in the bottom of the tank, thereby potentially reducing the energy that must be provided in order to thoroughly mix the liquid in the vessel. Non-cylindrical vessels and vessels having flat, curved, or otherwise-shaped bottoms can be used. For example, the vessel can have the shape of an elongated cube (i.e., one cross-section is rectangular). In the event a single tube is not sufficient to agitate, aerate, or both, the liquid in every portion of a vessel (e.g., an elongated vessel), more than one tube can be used, the tubes disposed at different locations in the vessel. In another embodiment, the vessel is a plastic cylinder with a parabolic, hemispheric, or conical bottom. The curved or conical bottom helps to concentrate settled solids in a compact region near the bottom of the vessel, to facilitate removal of the solids from the vessel.

The volume of the vessel is not critical. However, the volume of liquid which the vessel is capable of containing and the rate at which liquid is removed from the vessel should be selected so that the residence time of the vessel is sufficiently long to permit the desired degree of degradation and concentration of the solids (as assessed by concentration of mass or volume of the solids) to be achieved. The residence time (i.e., the working volume of the vessel divided by the rate at which fluid is withdrawn from the vessel) can be altered by altering the volume of liquid in the vessel, such as by selecting an appropriate volume when the digester is being designed, by altering the fluid depth in the vessel (e.g., using an adjustable discharge weir), or by occluding some volume in the vessel (e.g., by inflating a bladder within the vessel). The residence time can also be altered by altering the rate of withdrawal of fluid from the vessel. The range of suitable residence time values will generally depend on the source, type, and concentration of organic material being digested, the characteristics of micro-organisms in the sludge, the degree of oxygenation provided by the digester, the BOD strength of the sludge, operating characteristics of the digester, and other factors. These factors can be determined experimentally in a straightforward manner (e.g., using a bench- or pilot plant-scale model of the digester), and the range of suitable residence times thereby established. By way of example, the residence time can be as short as several hours for easily-digested substrates (e.g., simple sugars such as glucose or sucrose) or several days or weeks or longer for difficult-to-digest products (e.g., wood chips, vegetable matter, proteinaceous matter, animal fats and greases, and semi-soluble organic materials, whether naturally-occurring or man-made).

The vessel can have internal baffles therein for various purposes. In one embodiment, the internal baffles of the vessel shield a portion of the vessel interior from the kinetic mixing effects exerted upon the liquid in the vessel by the liquid conveyor. Liquid in this portion is relatively still, and solid particles can settle from the liquid; also, the baffle(s) can prevent entrained air from entering the portion, thereby inhibiting upwelling of fluid and suspended solids induced by rising air bubbles. The decant weir or liquid outlet can be disposed in this portion, and the baffles can reduce or minimize passage of solids from the interior of the vessel to the liquid effluent from the digester.

Internal baffles in the vessel can also be used to direct or affect fluid mixing in the vessel. For example, baffles placed substantially to obstruct or interrupt fluid circulation in the vessel can enhance the turbulence with which the liquid is mixed, enhancing contact between the liquid and suspended or entrained solids and gases. Alternatively, the baffles can extend generally vertically within the vessel (e.g., axially-extending baffles in a cylindrical vessel) in order to maximize fluid circulation effected by the liquid conveyor. By way of example, a cylindrical vessel can have axially-extending baffles extending inwardly from the vessel walls toward (or completely to) the exterior of the tube, axially-extending baffles extending outwardly from the tube toward (or completely to) the walls of the vessel, or baffles extending helically about the axis of the vessel.

The Tube

A tube having an opening at or near a proximal end thereof is disposed in the interior of the vessel so that the distal portion of the tube is in the lower portion of the interior of the vessel. The manner in which the tube and the vessel are maintained in their relative positions is not critical, and can be temporary or more permanent (e.g., a vessel having a tube mechanically attached thereto, either directly or by way of one or more connectors).

The vessel can have an apparatus resting on or connected to the bottom of the vessel for supporting the weight of the tube, holding the tube in place, or both. The apparatus can be integral with the distal end of the tube, integral with the lower interior surface of the vessel, attached to the distal end of the tube, attached to the lower interior surface of the vessel, in non-attached contact with the distal end of the tube, in non-attached contact with the lower interior surface of the vessel, or some combination of these. For example, the tube can have extensions at its distal end that are welded, glued, or screwed to the lower interior surface of the vessel or interlocked therewith. Alternatively, the tube can be suspended in the vessel without an apparatus connecting the tube and the lower surface of the vessel. Regardless of how the tube and the vessel are maintained in their relative positions, it is important that liquid is able to pass out of the distal end of the tube into the lower portion of the interior of the vessel, so that the liquid expelled from the tube (together with any entrained or suspended solids or gases) can mix with liquid in the vessel.

The dimensions of the tube are not critical, except that the cross-sectional area of the tube should permit passage of a sufficient volume of liquid through the tube using a liquid conveyor of reasonable power that expulsion of the liquid from the tube can effect significant mixing of the liquid in the vessel. Selection of tube cross-sectional dimensions and liquid conveyor type and power are typical design details that can be made by an ordinary worker with little or no experimentation. For example, for a cylindrical tube disposed coaxially within a cylindrical vessel, the diameter of the vessel will generally be from about times to about 5 times the diameter of the tube.

The cross-sectional shape of the tube need not be circular if means of conveying liquid down the tube other than a rotating impeller are used, nor need it necessarily have the same type of cross-sectional shape as the vessel (e.g., a tube having a circular cross-section can be used in a vessel having a square cross-section).

When a single tube is disposed in the vessel, it is preferably disposed at or toward the center of the vessel (viewed from above). When multiple tubes are disposed in a single vessel, they can be adjacent one another, closely spaced, evenly spaced within the vessel, or placed at opposite ends of the vessel, for example.

Each tube is preferably disposed substantially vertically within the vessel (i.e., so that the center of gravity of the tube is above the distal end thereof). However, the tubes can be disposed in an inclined position (e.g., inclined 15, 30, 45, or 60 degrees from vertical).

The depth to which the tube is disposed in the vessel is likewise not critical. Generally, the distal end of the tube should be in the lower half of the liquid within the vessel (except during start-up or restart after digested sludge withdrawal for processing and disposal, when the liquid volume can be abnormally low), and preferably within the lower quarter of the liquid in the vessel. Greater spacing between the distal end of the tube and the lower interior surface of the vessel can facilitate greater fluid flow therebetween, improving aeration and mixing of the liquid in the vessel. Lesser spacing between the distal end of the tube and the lower interior surface of the vessel can facilitate a faster fluid velocity therebetween, improving suspension of settled solid materials on the lower interior surface of the vessel. Selection of spacing between the distal end of the tube and the lower interior surface of the vessel is a routine design choice that can be made based on the nature of the anticipated contents of the vessel, the cost of powering the liquid conveyor, and other ordinary design factors. By way of example, when a cylindrical tube having an open distal end and a diameter of about 40 inches is maintained in the lower portion of a cylindrical vessel having a diameter of about 12 feet, then the spacing between the tube and the lower interior surface of the vessel is in the range from about 2 inches (i.e., $\frac{1}{20}$ the diameter of the tube) to about 15 inches (i.e., $\frac{3}{8}$ the diameter of the tube), with a preferred distance of about $\frac{1}{10}$ the diameter of the tube (i.e., about 4 inches, for this example). When the tube wall extends to the floor of the vessel (e.g., to physically support the tube and the liquid conveyer), openings can be disposed around the circumference of the tube, at or near its distal end. The height of the openings will generally be taller than the distances mentioned in the previous sentences, so that approximately the same area between the tube and the lower interior surface of the vessel is open for fluid flow between the tube and the vessel.

It is important is that the number, size, position, and orientation of the tubes be selected in order to effect at least substantial mixing of the liquid in the vessel, and preferably to effect thorough mixing of the liquid. These parameters should be selected to minimize 'dead zones' in which little fluid circulation occurs in the vessel. In one embodiment, a portion of the digester is isolated (e.g., a "wedge" of a cylindrical tank in which a column of liquid is isolated by baffles except at the top and bottom) so that relatively little fluid circulation occurs in that portion and solids in that portion settle. By way of example, such an isolated portion might permit solids to settle from the liquid in the vessel prior to being withdrawn by way of a decant weir. Isolated portions of the vessel can also provide a portion with reduced oxygen content, in which fermentative degradative processes can complement aerobic digestive processes that occur in other portions of the vessel.

Fluid circulation in the vessel can be described in terms of a turnover time, which is equal to the total volume of liquid in the vessel divided by volumetric flow rate of liquid through the tube. Desirable turnover time values will vary with the composition of the wastewater being treated, the microbial population of the digester, the rate of air entrainment, and other operating parameters. Examples of desirable turnover time values for a municipal wastewater treatment process can be in the range of about 1 to about 5 minutes.

The tube has one or more openings in its wall, at least one opening being located at a position along the axis of the tube such that liquid in the vessel is able to flow through the opening from the exterior of the tube to the interior of the tube. The openings permit fluid circulation within the vessel from the exterior of the tube, into and toward the distal end of the tube, and out the distal end of the tube back to the exterior thereof.

The number, size, and shape of the openings in the tube are not critical. However, the area of the openings should permit the desired fluid flow through the tube at a reasonable power load on the liquid conveyor and with sufficient flow restriction to create the desired air entrainment vortices inside the tube. Openings will often be arranged circumferentially about the tube at an axial position corresponding to an impeller of the liquid conveyor, so that liquid will flow through each of the circumferential openings when the liquid level in the vessel reaches a selected level. When the digester is designed for use at varying liquid levels in the vessel, the tube preferably has several openings disposed along the length of its axis, so that fluid flow into the tube from its exterior is facilitated when fluid in the vessel reaches selected levels. The openings can be round, rectangular, oval, or irregularly-shaped holes in the tube, the precise shape not being critical. When the openings are arranged circumferentially at an axial position on the tube, a single opening should comprise about 10% to about 20% of the circumference at that axial position. When multiple (e.g., five) openings are present at the same axial position on the tube, the openings preferably still should comprise about 10% to about 20% of the circumference of the tube at that axial position in order to create the desired entrainment vortices at reasonable power levels.

When the openings are axially spaced on the tube, it is preferable to stagger them circumferentially for structural and good flow distribution reasons, but they can be axially situated at the same circumferential position along the tube (e.g., above one another when the tube is maintained vertically) without significantly affecting fluid flow and-aeration. That is, the openings can all have the same circumferential position (i.e., all on the same "side" of the tube), helically-spaced positions, or random positions.

The tube can have pivoting, rotating, deforming, or other apparatus that cover part or all of individual openings, in order to inhibit or prevent liquid flow from the interior of the tube to the exterior thereof, while permitting in-flow of liquid to the interior of the tube. Similarly, the tube can have baffles positioned above, around, or near individual openings, for directing liquid flow from above the opening toward the center of the tube and reducing outflow of liquid in the tube outwardly through the opening or through an opening below or adjacent to the opening.

In prior art sludge digesters, foam, scum, or both, often accumulate at the top of the liquid in the digester and interfere with its operation. One advantage of the digester disclosed herein is that any foam or scum that forms at the top of the liquid in the vessel can be drawn into the tube and dissolved or suspended in the liquid. When the level of liquid that will be maintained in the vessel is known, the tube preferably has an opening situated axially at a position that allows flow of liquid (and foam or scum) from liquid surface in the vessel into the interior of the tube. Alternatively, the proximal end of the tube can be situated at or below the anticipated liquid level in order to permit overflow of liquid, foam, and scum into the tube at its proximal end. When the level of liquid that will occur in the vessel is not known, the tube preferably has multiple openings situated axially thereon, so that liquid, foam, and scum can flow through one or more openings into the interior of the tube at any of several liquid levels.

The distal end of the tube is at least partially open (at least when the liquid conveyor is operating), so that liquid driven by the liquid conveyor can pass from the interior of the tube to its exterior at or near its distal end. In a preferred embodiment, the tube is substantially completely open at its distal end (e.g., a cylindrical pipe that is open at its distal end). In another embodiment, the tube is an open cylinder that is connected to the lower interior surface of the vessel by way of extensions from the tube to the surface (or from the surface to the tube), wherein the extensions do not occlude more than about 40% to about 60% of the circumferential area between the distal end of the tube and the vessel surface.

The cross-sectional dimensions of the tube need not be constant along its length, although a substantially constant cross-section can simplify its fabrication. The tube can have one or more narrowed portions, such as at or near the air-liquid interface for improving entrainment of air into the liquid. In one embodiment, the tube has a narrowed cross section at its distal end (or is tapered along its entire length, the narrowest portion being at the distal end), so that liquid displaced through the tube exits the distal end at a linear velocity greater than its linear velocity at higher points in the tube. This can enhance mixing and entrainment of solids that have settled on the floor of the digester.

The tube can have one or more baffles in the interior thereof. These baffles, when present, should extend axially along the length of the tube for at least a short distance (e.g., between the axial positions of two openings). In one embodiment, one or more baffles extend vertically from above the maximum liquid level (or maximum anticipated liquid level) to a position just above the uppermost liquid conveyer. In another embodiment, one or more baffles extend from just below the lowermost liquid conveyer to or about to the distal end of the tube. The baffle(s) within the tube serve to reduce non-axial flow within the tube.

As with the vessel, the exact materials and methods used to fabricate the tube are not critical. The materials should be selected so that the tube will economically exhibit sufficient strength, resilience, and corrosion resistance that it will have a reasonable useful life (e.g., preferably many years under the anticipated operating conditions). Plastics, metals, fiberglass, and laminate materials are among the materials from which the tube can be suitably fabricated.

The Liquid Conveyor

The liquid conveyor serves to displace liquid along the tube toward its distal end, thereby providing the power input that drives fluid circulation in the digester vessel. The size, type, power, and means of connection of the liquid conveyor are not critical, so long as it is able to perform this function. The capacity of the liquid conveyor should be selected such that it can deliver the flow corresponding to a selected turnover time under the conditions of the hydraulic head anticipated in the vessel.

Numerous types of pumps and other liquid displacing devices are known, and substantially any of these can be used as the liquid conveyor in the digester described herein, at least with suitable fittings. The liquid conveyor should be adapted to the tube so that the liquid conveyor draws liquid from within the tube at a location that is at or below the level (i.e., the level along the axis of the tube) of at least one opening in the tube. The liquid conveyor should discharge liquid below the level of at least one opening in the tube, and preferably at a level below (i.e., more distal with respect to) every opening in the tube. Thus adapted to the tube, the liquid conveyor will expel liquid from the distal end of the tube, cause liquid in the vessel to circulate between the distal end of the tube and at least one opening thereof, and draw liquid and air in through one or more openings of the tube.

One of the simpler liquid conveyors that is suitable for use in the digester described herein is a rotating shaft disposed within the tube. The shaft has at least one impeller (e.g., a propeller-shaped impeller) attached thereto, so that the impeller drives fluid flow toward the distal end of the tube when the shaft rotates. The impeller should be located at or, preferably, below the axial (with regard to the axis of the tube) position of at least one opening in the tube. In one embodiment, an impeller is located at or near the air-liquid interface in the tube and serves to enhance entrainment of air into the liquid. The shaft can have multiple impellers attached thereto. Some or all of the impellers can be positioned axially so that they are at or below the (tube) axial position of corresponding openings. Some impellers can also be positioned within the tube such that they are not especially near any opening, but instead serve to drive liquid axially within the tube towards its distal end.

The liquid conveyor can also be another type of pump, such as a centrifugal pump. By way of example, the centrifugal pump can be mounted within the tube in such a way that it draws liquid from the interior of the tube at a level at or below the level of a opening and discharges the liquid below the level of the opening, thereby effecting distally-directed axial fluid flow in the tube. Alternatively, a centrifugal pump can be physically mounted outside the tube and connected to the interior of the tube by conduits. The conduit connected to the pump inlet should draw liquid from within the tube at a level at or below the level of an opening, and the conduit connected to the pump outlet should discharge the liquid within the tube at a level below the level of the opening. Of course, other liquid conveying apparatus can be used (e.g., an Archimedes-screw-type conveyor), following the direction provided herein. The liquid conveyor preferably does not extend beyond the distal end of the tube. However, a liquid conveyor can be positioned beneath the distal end of the tube (e.g., rotating vanes beneath the distal end of the tube, supported and driven by a rotating shaft extending proximally through the tube) such that it draws liquid from within the tube, thereby inducing fluid circulation within the vessel as described herein.

The liquid conveyor can have an air injection apparatus associated with it. By way of example, if the liquid conveyor comprises a rotating shaft and an impeller, the shaft can have one or more air injection channels therein, wherein each channel connects an air source (e.g., the atmosphere or a stored gas such as compressed air or purified oxygen) with an air supply orifice that is normally below the surface of liquid in the tube. Expulsion of air from the orifice can be induced by rotation of the shaft, by pressure from the source, or both. The shaft can further comprise an air injector that is in fluid communication with the air injection channel and that is radially disposed (i.e., perpendicularly to the axis of the shaft or at an angle of less than 90 degrees from the shaft in any direction) from the shaft. Because the outlet of the air injector travels through a greater arc than the surface of the shaft, the pressure drop caused by passage of the outlet of the air injector through liquid in the tube will be greater than the pressure drop caused by passage of an air injection outlet on the surface of the shaft through liquid in the tube, resulting in enhanced draw of air into the liquid. Examples of shafts having suitable air injection channels, air injectors, or both, are shown in U.S. Pat. Nos. 4,267,052 and 4,940,540.

The vessel can have supplemental mixers, spargers, or other apparatus disposed or extending therein in order to improve mixing and aeration of the liquid in the vessel.

Conduits

The digester described herein can be connected with a variety of inlet sources and outlet receivers by way of liquid conduits. The type, dimensions, and construction of the liquid conduits used are not critical. Of course, the type of liquids to be transmitted in the conduit, the temperature at which the digester will be operated, the desired lifetime of the conduit, the cost of the materials, and the transportability of the conduit can influence the design of the conduits, but, in light of the present disclosure, these parameters represent merely normal design choices that are within the ken of the skilled engineer.

A wastewater or sludge supply line can be connected to a liquid inlet of the digester in order to deliver wastewater or sludge from a source (e.g., a raw wastewater or an effluent from another wastewater treatment apparatus, such as a primary clarifier) to the interior of the vessel. The identity and structure of the wastewater or sludge supply line are not critical. However, the line should be constructed to accommodate anticipated liquid flows and to offer sufficient corrosion resistance to withstand the effects of the anticipated wastewater for the desired life of the line. The means by which wastewater is delivered through the line is not important. Known liquid delivery methods include centrifugal and other mechanical pumps, gravity flow, and air-lift fluid handling methods. The choice of fluid convective means can depend on the specific wastewater or site characteristics, and, in light of the present disclosure, is simply an ordinary engineering design choice.

In some instances no conduit will be needed for inflow of wastewater, such as when the source of the wastewater is an immediately preceding wastewater treatment process (e.g., in a common wall multi-cell reactor). The wastewater efflux from the preceding process can be fed directly into mixing chamber or transmitted thereto using a conduit.

The liquid inlet should feed incoming liquid to the lower portion of the vessel, or to the interior of the tube. Where an external pump having conduits extending into the tube is used, the wastewater inlet can feed incoming wastewater into the pump inlet, so that the incoming wastewater is fed to the lower portion of the vessel by way of the tube.

A treated wastewater effluent line can be connected to the liquid outlet of the digester, in order to carry solids free treated wastewater away from the digester (e.g., to another treatment apparatus, such as a secondary clarifier or solids thickener). Liquid to be withdrawn from the digester vessel should be taken from the upper portion of the vessel, preferably from the top of the liquid column in the vessel after allowing the solids therein to settle by gravity. In order to minimize entrainment of suspended solids in the effluent in this operating mode called the continuous flow mode, one or more baffles can be interposed between the liquid outlet and either the distal end of the tube or the lower portion of the vessel. These baffles are preferably arranged to inhibit circulation of liquid near the liquid outlet in response to any bulk liquid flows in the vessel, thereby enhancing settling of any suspended solids from the liquid near the outlet. If the digester is fed new wastewater and simultaneously decanted while the liquid conveyor is operating, the baffles preferably deflect gas bubbles rising through the liquid away from the liquid outlet, so that the bubbles do not carry or impel movement of solids toward the liquid outlet.

In one embodiment, the liquid outlet is, or is connected with, a decant weir. The decant weir comprises a body that contacts the liquid in the vessel and defines a void within the body or on one side of the body. The body has a notch (e.g., a rectangular or V-shaped notch), slot, or other depressed portion along its upper surface, so that liquid is able to flow to the void through the notch, slot, or depressed portion while being repulsed by the remainder of the body. The decant weir serves to ensure that liquid is drawn substantially only from the top of the liquid column within the baffled area and after solids have settled. The weir can also exclude larger solid particles, reducing their uptake into the liquid effluent from the digester.

The decant weir can be fixedly attached to the vessel (e.g., at a fixed position along the wall of the vessel. The decant weir can, alternatively, be permitted to float on top of liquid in the vessel or contained within a cage-type apparatus that permits the decant weir to move vertically within the apparatus (i.e., either by floating on the liquid or as adjusted by an operator). As with the liquid outlet, the decant weir can be in a portion of the vessel that is separated from the distal end of the tube, from the lower portion of the vessel, or from both, by one or more baffles. The decant weir can be an integral part of the vessel (e.g., a notch cut or formed in the side of the vessel to permit overflow of liquid therein through the notch).

The digester can have a solids disposal outlet connected to a solids outlet line, for withdrawing settled or suspended solids from the interior of the vessel and providing them to a storage tank or another processing apparatus (e.g., to a second digester described herein, to an anaerobic digester, to a solids filter, or to a clarifier). The solids disposal outlet is preferably disposed in the lower portion of the vessel, and can be situated at a lowered portion (or at the lowest point) of the vessel in order to facilitate removal of the densest solid materials first.

Although the digester described above with a continuous flow through the decant weir can be operated with a constantly-open solids disposal outlet and line, a flow regulator preferably is installed in one or both of the solids disposal line and outlet in order to modulate flow of liquid and solids suspended in the liquid therethrough. One advantage of the digester described herein is that it can produce sludge that is significantly more concentrated than can be produced using prior aerobic digestion units. Thus, for a given wastewater stream, the digester described herein can often be operated for a longer period of time than prior aerobic digesters before solids build to an unacceptably high level in the liquid in the vessel. Under many operating schemes, the digester described herein will be operated with the solids disposal outlet or line closed (i.e., no flow therethrough) while non-digestible sludge accumulates in the vessel (and digestible materials are digested). In such operating schemes, the solids disposal outlet and line are closed until the level of solids in the digester effluent exceeds a selected value. At this point, some, most, or all of the liquid and solids in the vessel is withdrawn therefrom by way of the solids disposal outlet and line (optionally after letting the vessel contents settle for minutes, hours, or days). Alternatively, the digester can be operated in a continuous or semi-continuous fashion by continuously or intermittently withdrawing liquid and solids from the vessel by way of the solids disposal outlet and line.

In one embodiment, the flow regulator is connected with a sensor. The sensor is in sensory communication with the liquid passing through the decant weir, liquid outlet or treated wastewater effluent line or, more commonly, with liquid in the interior of the vessel. The sensor is able to detect the solids content of the fluid. The type of sensor used to assess solids content is not critical. Examples of suitable sensors include turbidity sensors (e.g., sensors which assess transmission of light through the fluid) and viscosity sensors.

The sensor can be connected with a display, so as to indicate the solids content to an operator or to any known chemical process controller (e.g., proportional, proportional-integral or proportional-integral-derivative (P, PI, or PID) type mechanical, pneumatic, or electrical controllers), connecting in signaling communication with the flow regulators, meaning that the sensor transmits a signal related to the solids content of the sensed liquid to the regulator so that flow through the solids disposal line, decant weir, liquid outlet or treated wastewater effluent line can be modulated as desired. Typically, a set point value (e.g., 15 to 40 grams of solids per liter of liquid, on a dry weight basis, and preferably 20 to 30 grams per liter) is programmed or set for the controller and signals from the sensor are compared with the set point signal. Any difference between the two signals is communicated by the controller to the flow regulators in order to modulate flows through the solids disposal line, decant weir, liquid outlet or treated wastewater effluent line can be modulated as desired and bring the sensed value closer to the set point value.

The digester described herein can be used as a stand-alone unit. However, it is contemplated that the digester will often be used as a module in a multi-step wastewater treatment process, such as that illustrated in FIG. 3. Sludge or liquid containing other solids or organic material can be withdrawn from one step in the process and fed to the digester in order to reduce the mass and volume of solids. Concentrated sludge can be stored or disposed of, and liquid decanted from the digester can be returned to the wastewater process. Furthermore, it is contemplated that multiple digester units can be used in series, in parallel, in a cascade, or in a reverse cascade in a variety of configurations (e.g., those shown in FIG. 4). When the digester is used as a part of a multi-stage wastewater treatment process, liquid and solids flow between the stages of the process can be effected by any known means. In a preferred embodiment, a single pump is selectably connectable with a variety of liquid circuits that interconnect the stages of the process, so that a single pump can provide all flows needed in the process.

Methods of Operating the Digester

The digester described herein can have significant advantages over prior aerobic wastewater digestion units, even though it can be operated in substantially the same way as prior units. Unlike many prior aerobic digesters, the digesters described herein can be operated with varying volumes and produce relatively concentrated residual sludge.

Basically, the digester is operated by activating the liquid conveyor to effect circulation of wastewater containing organic material, etc., in the vessel. The aeration and agitation effected by the circulation enhances the ability of microorganisms in the vessel to degrade the organic material.

In one embodiment, the digester described herein is operated at a relatively low liquid level (e.g., the vessel containing liquid equal to about 25% or less of the vessel's capacity), and is operated while additional wastewater or sludge is added to the vessel. The digester can be operated continuously or semi-continuously (with or without removal of effluent) until the liquid content of the vessel reaches the capacity of the vessel. Once the vessel is filled, mixing and aeration can be intermittently or periodically halted in order to permit settling of solids in the liquid in the vessel (e.g., for a selected period of minutes, hours, or days). Mixing and aeration can be restarted thereafter to continue digestion. After solids in the vessel liquid have settled (and preferably before resuming mixing and aeration), additional sludge or wastewater can be added to the vessel (preferably to the lower portion of the vessel), thereby displacing from the vessel liquid from which solids have settled. This semi-continuous mode of operation can continue until there is little or no liquid that becomes relatively clarified during the settling phase of the operation. Once the vessel is filled, or nearly filled, with liquid or slurry that cannot be sufficiently clarified by settling, most or all of the liquid or slurry in the vessel can be discharged from the vessel (e.g., into a holding tank, a refuse carrier, a landfill or a solids dewatering unit). At least a small amount of solids (i.e., including microorganisms) can be retained in the vessel, so that microbial degradation is not inhibited by a shortfall of degrading organisms and their associated enzymes as the filling, digestion, and cyclic aeration and decant processes are repeated. Relatively clarified liquid decanted from the vessel while adding wastewater or sludge during or after a settling cycle can be returned to another wastewater treatment apparatus, such as a fixed-film biological digester or a clarifier.

In a different embodiment, the digester operates at an increasing liquid level therein until the vessel is filled. Operation of the digester then continues until the amount of solids in the decanted or withdrawn effluent flowing from the continuous decant weir reaches or exceeds a maximum acceptable level. At that time, liquid, solids, or a liquid-solids slurry can be removed from the vessel in order to reduce the solids content in the vessel. The digester can be operated during this liquid removal, or operation can be discontinued during (or for a selected period of minutes, hours, or days before) the liquid removal. At least a small amount of solids (i.e., including microorganisms) can be retained in the vessel, so that microbial degradation is not inhibited by a shortfall of degrading organisms and their associated enzymes as the filling, digestion, and cyclic aeration and decant processes are repeated.

In another embodiment, the digester is operated in a continuous mode. In this mode, wastewater or sludge is fed continuously or intermittently to the digester, and effluent is withdrawn or decanted as the liquid content of the vessel exceeds the vessel's capacity. Solids (including inorganic and organic material) content of the effluent is monitored (manually or automatically), and solids-containing liquid is withdrawn from the vessel if the solids content of the effluent is greater than desired. Withdrawn solids-liquid slurry can be stored, settled, or filtered prior to disposal of the solids, and any liquid filtrate or settling supernatant can be returned to the digester or to another component (e.g., a biological reactor) of the wastewater process with which the digester is associated. In this continuous mode, the digester can be operated for an extended period of time, possibly limited only by the stability or reliability of the components.

The digester can be seeded or supplemented with microorganisms obtained from a wastewater, a sludge, or a commercial source for example. Supplementation of the microorganisms in the vessel can be desirable at start-up or after flushing liquid from the digester when the solids or organic material content of the digester effluent exceeds a desired value.

The disclosure of every patent, patent application, and publication cited herein is incorporated herein by reference in its entirety.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An aerobic digester for organic material comprising:
    a vessel for containing a liquid comprising the organic material, the vessel having an interior comprising an upper portion, a lower portion and a lower interior surface;
    a tube having a distal end disposed in the lower portion of the interior of the vessel, an opening in a wall of the tube for permitting liquid and air flow between an exterior and an interior of the tube, and at least one discharge port disposed in the distal end; and
    a liquid conveyor connected in fluid communication with the interior of the tube for inducing flow of the liquid along the tube in the direction of the distal end,
    whereby the liquid conveyor induces entrainment of air drawn into the tube through the opening into the liquid drawn into the tube through the opening to form a liquid-air mixture and expulsion of the liquid-air mixture from the tube through the at least one discharge port into the lower portion of the vessel, thereby causing liquid contained in the vessel to be mixed and aerated.

2. The digester of claim 1, wherein the liquid conveyor is at least partially disposed within the tube.

3. The digester of claim 2, wherein the liquid conveyor comprises a motor having a shaft rotatably connected thereto, the shaft having at least one impeller attached thereto and being disposed within the tube.

4. The digester of claim 3, wherein the impeller is disposed within the interior of the tube at a level below a lowermost level of the opening.

5. The digester of claim 4, wherein the tube comprises at least two openings spaced along the length of the tube and the liquid conveyor comprises at least two impellers, each of the impellers being disposed below a different opening.

6. The digester of claim 5, wherein the tube comprises an upper opening, an intermediate opening distally disposed along the length of the tube below the upper opening, and a lower opening distally disposed along the length of the tube below the intermediate opening, and whereby the liquid conveyor comprises an upper impeller disposed below the intermediate opening, but above the lower opening, and a lower impeller disposed below the lower opening.

7. The digester of claim 6, wherein air enters the tube through the upper opening.

8. The digester of claim 7, wherein liquid enters the tube through the intermediate and lower openings.

9. The digester of claim 8, wherein liquid in the vessel is maintained at a level between the upper and intermediate openings.

10. The digester of claim 1, wherein air is supplied to the upper portion of the vessel by a fan.

11. The digester of claim 1, wherein the tube has an internal baffle extending along at least a portion of a length of the tube for reducing liquid flow in directions not parallel with a longitudinal axis of the tube.

12. The digester of claim 1, wherein the tube is oriented substantially vertically.

13. The digester of claim 1, wherein the tube has a substantially constant diameter along its length.

14. The digester of claim 1, wherein the tube has a substantially circular cross-section along its entire length.

15. The digester of claim 1, wherein the tube is fixed to the lower interior surface of the vessel.

16. The digester of claim 14, wherein the liquid conveyor comprises a rotating shaft rotatably supported in a shaft support.

17. The digester of claim 1, wherein the opening extends through about 10% to about 20% of the circumference of the tube.

18. The digester of claim 1, wherein the opening extends through at least about 20% of the circumference of the tube.

19. The digester of claim 1, wherein the opening is dimensioned such that the area of the opening is about 10% to about 20% of the cross-sectional area of the tube at a lowermost level of the opening.

20. The digester of claim 1, wherein the opening is positioned axially along the tube such that the surface of liquid in the vessel is within the opening during operation of the digester.

21. The digester of claim 1, further comprising a liquid inlet for providing liquid to the interior of the vessel.

22. The digester of claim 21, wherein the liquid inlet discharges liquid into the lower portion of the interior of the vessel.

23. The digester of claim 21, wherein the liquid inlet is in fluid communication with the solids discharge outlet of a wastewater primary clarifying apparatus.

24. The digester of claim 1, further comprising a liquid outlet for discharging liquid from the interior of the vessel.

25. The digester of claim 24, wherein the liquid outlet is in fluid communication with a decant weir having an opening disposed at or near the upper surface of the liquid in the vessel, for withdrawing liquid from or near the upper surface of the liquid and delivering the withdrawn liquid to the liquid outlet.

26. The digester of claim 25, wherein the decant weir is fixed in the interior of the vessel, whereby the decant weir maintains a maximum liquid depth in the vessel.

27. The digester of claim 25, wherein the decant weir is vertically movably disposed in the interior of the vessel with respect to the upper surface of the liquid.

28. The digester of claim 24, wherein a bulk fluid flow baffle is interposed between the distal end of the tube and the liquid outlet, whereby the bulk fluid flow baffle inhibits withdrawal from the vessel of solids suspended in the liquid.

29. The digester of claim 24, further comprising a suspended solids sensor in sensory communication with liquid in the vessel.

30. The digester of claim 29, wherein the sensor is a turbidity sensor.

31. The digester of claim 29, wherein the sensor is a viscosity sensor.

32. The digester of claim 29, further comprising an alarm in signaling communication with the sensor, for indicating when the level of suspended solids in liquid in the liquid outlet exceeds a selected value.

33. The digester of claim 29, further comprising a solids disposal outlet in fluid communication with a flow regulator that is in fluid communication with the lower portion of the interior of the vessel and in signaling communication with the sensor, whereby the flow regulator permits withdrawal of liquid and residual sludge from the vessel by way of the solids disposal outlet when the level of suspended solids in liquid in the liquid outlet exceeds a selected value.

34. The digester of claim 1, further comprising a solids disposal outlet in fluid communication with the lower portion of the interior of the vessel.

35. The digester of claim 34, wherein the solids disposal outlet is in fluid communication with a sludge holding tank.

36. The digester of claim 34, wherein the solids disposal outlet is in fluid communication with a solids filter for separating liquid withdrawn from the vessel into filtered solids and solids filtrate fractions.

37. The digester of claim 36, further comprising a return line for returning the solids filtrate to a biological reactor.

38. The digester of claim 34, wherein a flow regulator is disposed in a discharge line extending from the solids disposal outlet.

39. The digester of claim 38, wherein the regulator is a valve.

40. The digester of claim 38, wherein the regulator is a pump.

41. A wastewater treatment system comprising a primary clarifier for removing bulk solids from a wastewater stream, the primary clarifier being upstream from a biological reactor for degrading an organic material in the stream, the reactor being upstream from a secondary clarifier for removing solids from a post-reactor waste-stream, and the digester of claim 1 being in fluid communication with a solids discharge outlet of one or both of the primary clarifier and the secondary clarifier.

42. The system of claim 41, wherein a single pump selectably connected with multiple fluid circuits drives fluid flow between the primary clarifier, the biological reactor, the secondary clarifier, and the digester of claim 1.

43. The system of claim 42, wherein separate pumps are selectably connected with multiple fluid circuits and drive fluid flow between the primary clarifier, the biological reactor, the secondary clarifier, and the digester of claim 1.

44. A method of aerobically digesting organic material in wastewater, the method comprising the steps of:
a) providing the wastewater comprising the organic material to a digester that comprises:
   a vessel for containing a liquid, the vessel having an interior comprising an upper portion and a lower portion and a lower interior surface;
   a tube having a distal end disposed in the lower portion of the interior of the vessel, an opening in the wall of the tube for permitting liquid and air flow between the exterior and interior of the tube, and at least one discharge port disposed in the distal end; and
   a liquid conveyor disposed within the tube for inducing flow of the liquid through the tube in the direction of the distal end, the conveyor comprising an impeller disposed below the opening; and
b) circulating the liquid in the digester by way of the tube, whereby the conveyor induces entrainment of air into the liquid drawn into the tube by way of the opening to form a liquid-air mixture and expulsion of the liquid-air mixture from the tube through the at least one discharge port, thereby inducing mixing and aeration of the liquid in the vessel and digesting organic material in the wastewater.

45. The method of claim 44, further comprising the step of operating the liquid conveyor for a predetermined period.

46. The method of claim 45, further comprising the step of discontinuing operation of the liquid conveyor to allow gravity sedimentation of solids in the wastewater for a predetermined period.

47. The method of claim 46, further comprising the step of testing the clarity of the liquid in the vessel at a predetermined position within the vessel.

48. The method of claim 47, further comprising the step of withdrawing liquid from a lower portion of the vessel if the clarity is below a predetermined level.

49. The method of claim 48, further comprising the step of withdrawing liquid from an upper portion of the vessel if the clarity is above a predetermined level.

* * * * *